US007782640B2

(12) United States Patent
Yun

(10) Patent No.: US 7,782,640 B2
(45) Date of Patent: Aug. 24, 2010

(54) INVERTER CIRCUIT AND BACKLIGHT UNIT HAVING THE SAME

(75) Inventor: Chang Sun Yun, Gumi (KR)

(73) Assignee: LG Innotek Co., Ltd., Seoul (KR)

( * ) Notice: Subject to any disclaimer, the term of this patent is extended or adjusted under 35 U.S.C. 154(b) by 408 days.

(21) Appl. No.: 11/869,942

(22) Filed: Oct. 10, 2007

(65) Prior Publication Data

US 2008/0084722 A1 Apr. 10, 2008

(30) Foreign Application Priority Data

Oct. 10, 2006 (KR) ...................... 10-2006-0098576

(51) Int. Cl.
*H02M 3/24* (2006.01)

(52) U.S. Cl. .............................. 363/95; 363/49; 363/55

(58) Field of Classification Search ................... 363/95, 363/15, 18, 19, 20, 21.01, 49, 55, 56.01
See application file for complete search history.

(56) References Cited

U.S. PATENT DOCUMENTS

| | | | | |
|---|---|---|---|---|
| 5,528,486 | A * | 6/1996 | Kumar et al. | 363/95 |
| 2006/0171180 | A1 * | 8/2006 | Kyono | 363/95 |
| 2009/0021970 | A1 * | 1/2009 | Fukumoto | 363/131 |

* cited by examiner

*Primary Examiner*—Bao Q Vu
*Assistant Examiner*—Nguyen Tran
(74) *Attorney, Agent, or Firm*—Saliwanchik, Lloyd & Saliwanchik

(57) ABSTRACT

An inverter circuit according to an embodiment includes an input unit to which a first voltage is applied. In the inverter circuit, a transformer transforms the first voltage output from the input unit, and a first switching unit switches an on/off state of the transformer. An inverter controller controls an operation of the first switching unit, and an output unit of the inverter circuit outputs a second voltage output from the transformer. A feedback unit detects an electrical signal from the transformer and supplies the detected electrical signal to the inverter controller, and an initial operation controller controls an intensity of the electrical signal supplied to the inverter controller from the feedback unit.

13 Claims, 3 Drawing Sheets

INVERTER CIRCUIT AND BACKLIGHT UNIT HAVING THE SAME

CROSS-REFERENCE TO RELATED APPLICATION

The present application claims the benefit under 35 U.S.C. §119 of Korean Patent Application No. 10-2006-0098576, filed Oct. 10, 2006, which is hereby incorporated by reference in its entirety.

BACKGROUND

A backlight unit provides light to a display device such as a liquid crystal display for displaying an image. The backlight unit typically includes a light emitting unit and an inverter circuit. The light emitting unit emits the light, and the inverter circuit controls the operation of the light emitting unit. However, a lighting difficulty may occur at the light emitting unit in the backlight unit during the early stage of the operation.

BRIEF SUMMARY

Embodiments of the present invention provide an inverter circuit and a backlight unit having the same, capable of stably operating a light emitting unit.

An inverter circuit according to an embodiment of the present invention comprises an input unit to which a first voltage is applied, a transformer for transforming the first voltage output from the input unit, a first switching unit for switching an on/off state of the transformer, an inverter controller for controlling an operation of the first switching unit, an output unit for outputting a second voltage output from the transformer, a feedback unit for detecting an electrical signal from the transformer and supplying the detected electrical signal to the inverter controller, and an initial operation controller for controlling an intensity of the electrical signal supplied to the inverter controller from the feedback unit.

A backlight unit according to an embodiment of the present invention comprises an inverter circuit comprising an input unit to which a first voltage is applied, a transformer for transforming the first voltage output from the input unit, a first switching unit for switching an on/off state of the transformer, an inverter controller for controlling an operation of the first switching unit, an output unit for outputting a second voltage output from the transformer, a feedback unit for detecting an electrical signal from the transformer and supplying the detected electrical signal to the inverter controller, and an initial operation controller for controlling an intensity of the electrical signal supplied to the inverter controller from the feedback unit; and a light emitting unit for emitting light under a control of the inverter circuit.

DETAILED DESCRIPTION

Hereinafter, an embodiment of the present invention will be described in detail with reference to the accompanying drawings.

Figure 1:
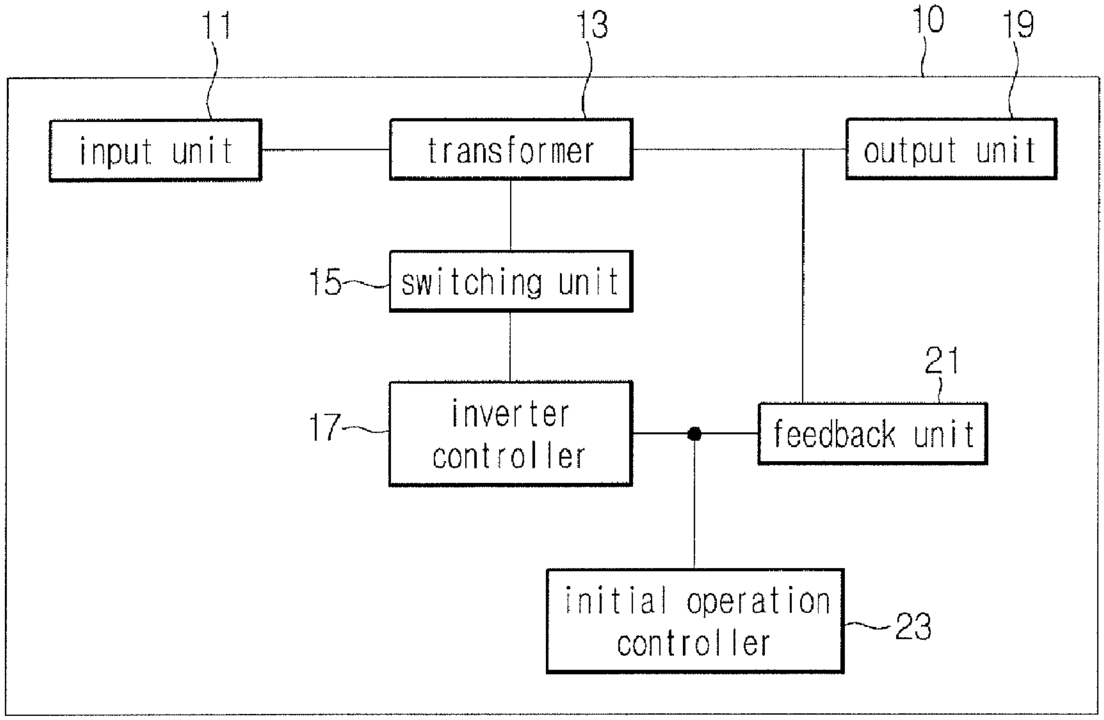
FIG. 1 is a block diagram showing an inverter circuit according to an embodiment of the present invention.

FIG. 1 is a block diagram showing an inverter circuit according to an embodiment.

As shown in FIG. 1, an inverter circuit 10 according to an embodiment comprises an input unit 11, a transformer 13, a switching unit 15, an inverter controller 17, an output unit 19, a feedback unit 21 and an initial operation controller 23.

A first voltage can be applied to the input unit 11. The transformer 13 transforms the first voltage applied thereto from the input unit 11 into a second voltage that is output to the output unit 19.

The switching unit 15 switches an on/off state of the transformer 13. The inverter controller 17 controls the operation of the switching unit 15. The feedback unit 21 detects an electrical signal output from the transformer 13, and supplies the detected electrical signal to the inverter controller 17. As one example, the electrical signal may comprise the second voltage output from the transformer 13.

The inverter controller 17 can turn on/off the switching unit 15 according to the intensity of the electrical signal supplied from the feedback unit 21. When the intensity of the detected electrical signal exceeds a predetermined value, the inverter controller 17 controls the intensity of the electrical signal output from the transformer 13 to reduce the intensity of the electrical signal. In addition, when the intensity of the detected electrical signal is less than a predetermined value, the inverter controller 17 controls the intensity of the electrical signal output from the transformer 13 to increase the intensity of the electrical signal. For example, the inverter controller 17 can control the intensity of the electrical signal output from the transformer 13 by controlling an on/off time (duty ratio) of the switching unit 15.

Figure 4:
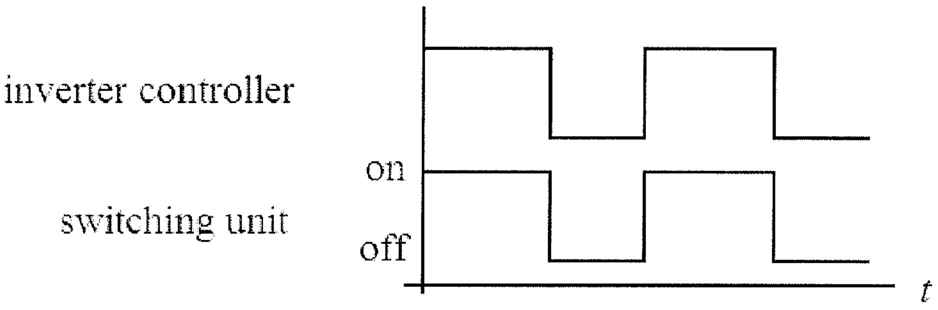
FIG. 4 shows an operation plot of the inverter controller and switching unit.

The initial operation controller 23 can control the intensity of the electrical signal supplied to the inverter controller 17 from the feedback unit 21. The inverter controller 17 can then turn on/off the switching unit 15 according to the intensity of the electrical signal controlled by the initial operation controller 23. The initial operation controller 23 can reduce the intensity of the electrical signal supplied to the inverter controller 17 from the feedback unit 21. When the intensity of the electrical signal supplied to the inverter controller 17 is reduced by the initial operation controller 23, the inverter controller 17 controls the on/off time (duty ratio) of the switching unit 15 to increase the intensity of the electrical signal output from the transformer 13. FIG. 4 shows an operation plot of the inverter controller 17 and the switching unit 15. Accordingly, the voltage output from the transformer 13 can be controlled to have a greater intensity. In addition, a current output from the transformer 13 can be controlled to have a greater intensity.

The initial operation controller 23 may reduce the intensity of the electrical signal supplied to the inverter controller 17 from the feedback unit 21 during only a predetermined time interval in the early stage of the operation. The initial operation controller 23 can maintain the electrical signal supplied to the inverter controller 17 from the feedback unit 21 when the predetermined time interval has lapsed.

Figure 5:
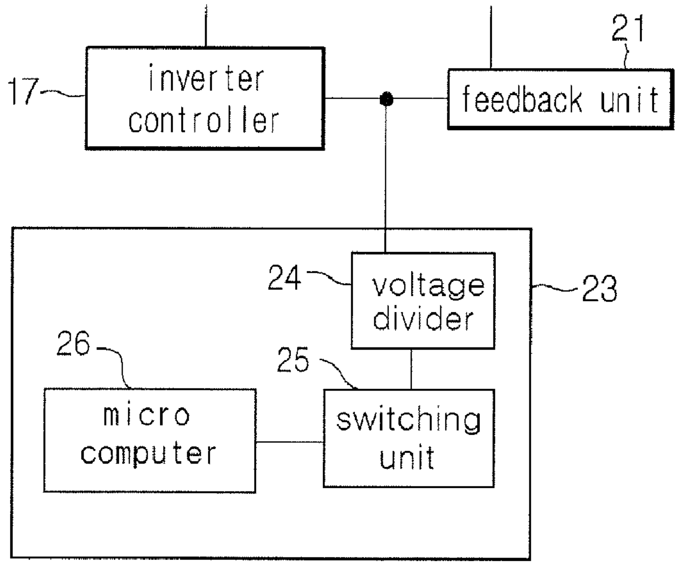
FIG. 5 is a block diagram showing an initial operation controller according to an embodiment of the present invention.

According to an embodiment of the present invention, the initial operation controller 23 can comprise a time interval setting unit for setting the operation time. As one example, the time interval setting unit may comprise a microcomputer. As shown in FIG. 5, a time interval setting unit includes: a voltage dividing resistor configuration 24 that divides a voltage e signal supplied to the inverter controller 17 from the feedback unit 21: a second switching unit 25 that allows the voltage signal divided by the voltage dividing resistor configuration 24 to be passed to a ground or inhibits the voltage signal divided by the voltage dividing resistor configuration 24 from being passed to the ground; and a microcontroller 26 that controls operation of the second switching unit 25. The operation time of the initial operation controller 23 can be controlled according to time interval information set in the microcomputer.

The time interval setting unit can be variously embodied. For example, the time interval setting unit may comprise a capacitor and a switching unit. Here, the on/off state of the switching unit can be controlled according to charging and discharging operations of the capacitor, so that the operation time of the initial operation controller 23 is controlled.

Figure 2:
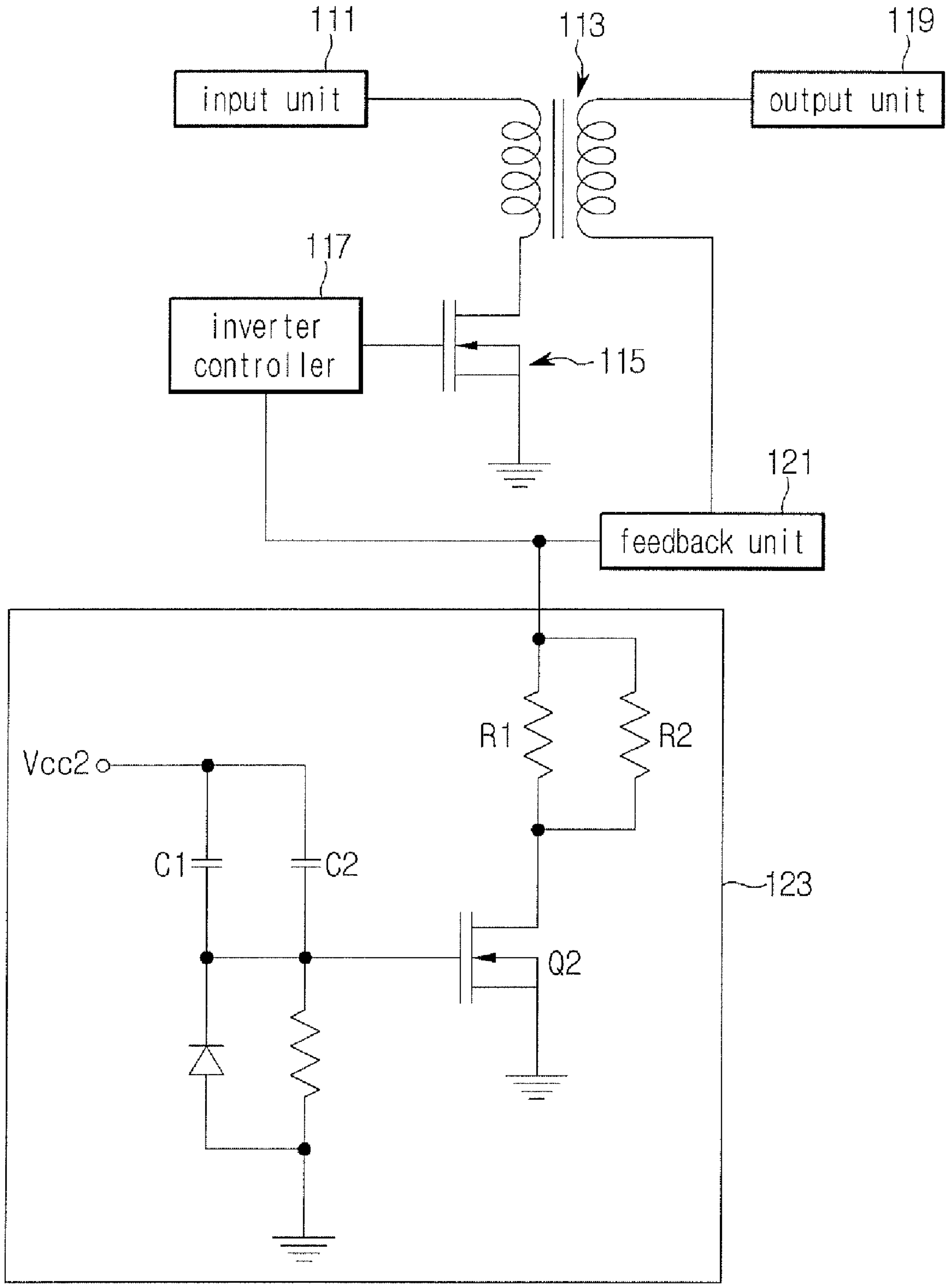
FIG. 2 is a circuit diagram showing an inverter circuit according to an embodiment of the present invention.

As one example, the inverter circuit as described above can be realized as shown in FIG. 2. FIG. 2 is a circuit diagram showing an inverter circuit according to an embodiment.

Referring to FIG. 2, a first voltage can be applied to an input unit 111. A transformer 113 transforms the first voltage applied thereto from the input unit 111 into a second voltage that is output to an output unit 119.

A first switching unit 115 turns on/off the transformer 113. The first switching unit 115 can comprise a field effect transistor (FET). The FET of the first switching unit 115 can be connected to one side of the transformer 113. The inverter controller 117 controls the operation of the first switching unit 115. A feedback unit 121 detects an electrical signal output from the transformer 113, and supplies the detected electrical signal to the inverter controller 117.

The feedback unit 121 can be connected to a secondary side of the transformer 113, and can comprise at least one resistor such that a voltage induced to the secondary side of the transformer 113 is dropped to a voltage having a predetermined level. The feedback unit 121 can then provide the dropped voltage to the inverter controller 117.

The inverter controller 117 can turn on/off the first switching unit 115 according to the intensity of the electrical signal supplied from the feedback unit 121. When the intensity of the detected electrical signal exceeds a predetermined value, the inverter controller 117 controls the intensity of the electrical signal output from the transformer 113 to reduce the intensity of the electrical signal. In addition, when the intensity of the detected electrical signal is less than a predetermined value, the inverter controller 117 controls the intensity of the electrical signal output from the transformer 113 to increase the intensity of the electrical signal. For example, the inverter controller 117 can control the intensity of the electrical signal output from the transformer 113 by controlling an on/off time (duty ratio) of the first switching unit 115.

An initial operation controller 123 can control the intensity of the electrical signal supplied to the inverter controller 117 from the feedback unit 121. The inverter controller 117 can turn on/off the first switching unit 115 according to the intensity of the electrical signal controlled by the initial operation controller 123. The initial operation controller 123 can reduce the intensity of the electrical signal supplied to the inverter controller 117 from the feedback unit 121. When the intensity of the electrical signal supplied to the inverter controller 117 is reduced by the initial operation controller 123, the inverter controller 117 controls the on/off time (duty ratio) of the first switching unit 115 to increase the intensity of the electrical signal output from the transformer 113. Accordingly, the voltage output from the transformer 113 can be controlled to have a greater intensity. In addition, a current output from the transformer 113 can be controlled to have a greater intensity.

The initial operation controller 123 is connected in parallel between the inverter controller 117 and the feedback unit 121. The initial operation controller 123 can comprise voltage dividing resistors R1 and R2 for dropping the voltage, which is supplied to the inverter controller 117 from the feedback unit 121, to a voltage having a predetermined level. The initial operation controller 123 can also comprise a second switching unit Q2 that allows a predetermined voltage, which is divided by the voltage dividing resistors R1 and R2, to be passed to a ground. As one example, the second switching unit Q2 may comprise a FET. In addition, the initial operation controller 123 can further comprise capacitors C1 and C2, which are charged with a predetermined voltage supplied from a second voltage source Vcc2, and then discharged over a predetermined period of time to affect the time for supplying a high voltage required for the initial operation.

The capacitors C1 and C2 can be connected to gate terminals of the second switching unit Q2. The capacitors C1 and C2 are charged with a second voltage Vcc2 supplied in the early stage of the operation, and then discharged. Accordingly, when the intensity of the voltage charged in the capacitors C1 and C2 is greater than that of a predetermined voltage (the threshold voltage of the second switching unit Q2), the second switching unit Q2 stays in the turn-on state. In such a case, a voltage applied to the voltage dividing resistors R1 and R2 can be passed to the ground. Therefore, the intensity of the electrical signal supplied to the inverter controller 117 from the feedback unit 121 can be reduced.

Figure 3:
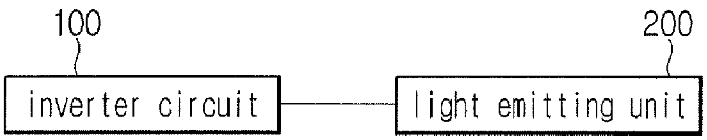
FIG. 3 is a block diagram showing a backlight unit according to an embodiment of the present invention.

As one example, the inverter circuit as described above can be applied to a backlight unit. FIG. 3 is a block diagram showing a backlight unit according to an embodiment.

As shown in FIG. 3, a backlight unit can comprise an inverter circuit 100 and a light emitting unit 200. The light emitting unit 200 may comprise a cold cathode fluorescent lamp (CCFL), an external electrode fluorescent lamp (EEFL), or a Light Emitting diode (LED). A lighting difficulty may occur in the light emitting unit 200 during the initial operation. Such an initial lighting difficulty is derived from unbalance in an initial impedance of a lamp. The lighting difficulty may occur more frequently at a lower temperature condition. This lighting difficulty can be inhibited or reduced by applying a higher voltage or a higher current during the initial operation.

Accordingly, by applying the inverter circuit according to the embodiment, the lighting difficulty can be inhibited from occurring at the backlight unit during the initial operation, so the backlight unit can be stably operated. Hereinafter, the operation of the backlight unit having the inverter circuit described with reference to FIG. 2 will be explained.

When the first switching unit 115 is turned on by the inverter controller 117, the transformer 113 is operated so that a power is applied to the light emitting unit 200 through the output 119. The light emitting unit 200 may comprise a CCFL, an EEFL, or an LED.

The feedback unit 121 can comprise a plurality of resistors to supply the electric signal to the inverter controller 117 by dividing the voltage supplied to the output 119 into voltages having a predetermined level. The inverter controller 117 controls the on/off time (duty ratio) of the first switching unit 115 on the basis of the supplied electrical signal. Accordingly, levels of the voltage and current, which are supplied to the output 119 from the transformer 113, can be controlled.

When an initial power is applied, the second voltage Vcc2 is charged in the capacitors C1 and C2 for a predetermined time. Then, the operation potential is supplied to the gate terminals of the second switching unit Q2 until the voltage charged in the capacitors C1 and C2 is completely discharged.

Here, when the voltage supplied to the gate terminals from the capacitors C1 and C2 is greater than the threshold voltage of the second switching unit Q2, the second switching unit Q2 is turned on.

When the second switching unit Q2 is operated, a voltage signal supplied to the inverter controller 117 from the feedback unit 121 is divided by the voltage dividing resistors R1 and R2, so that the voltage is dropped to a voltage having a predetermined level. The inverter controller 117 controls the first switching unit 115 to increase the turn-on time of the first switching unit 115. Accordingly, the intensity of the voltage supplied to the output 119 from transformer 113 can be increased. At this time, the intensity of the current supplied to the output 119 is also increased.

Next, if the voltage charged in the capacitors C1 and C2 becomes discharged to a level less than the threshold voltage of the second switching unit Q2, the second switching unit Q2 is turned off. Accordingly, an electrical signal, which is effectively the electrical signal employed in the normal operation from the feedback unit 121, is supplied to the inverter controller 117 from the feedback unit 121. Therefore, the inverter controller 117 controls the on/off time (duty ratio) of the first switching unit 115 such that the light emitting unit 200 can be operated in the normal state.

According to embodiments of the present invention, the level of the voltage supplied to the output unit 119 for a predetermined initial time can be increased according to an electrostatic capacitance of the capacitors C1 and C2. At the same time, the level of the current supplied to the output unit 119 can be increased. Accordingly, the initial operation difficulty can be inhibited from occurring in the lamp provided in the light emitting unit 200.

Any reference in this specification to "one embodiment", "an embodiment", "example embodiment" etc., means that a particular feature, structure, or characteristic described in connection with the embodiment is comprised in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An inverter circuit, comprising:

an input unit to which a first voltage is applied;

a transformer for transforming the first voltage from the input unit to a second voltage;

a first switching unit for switching an on/off state of the transformer;

an inverter controller for controlling an operation of the first switching unit;

an output unit for outputting the second voltage from the transformer;

a feedback unit for detecting an electrical signal from the transformer and supplying the detected electrical signal to the inverter controller; and an initial operation controller for controlling an intensity of the electrical signal supplied to the inverter controller from the feedback unit, wherein the initial operation controller comprises:

a voltage dividing resistor configuration that divides a voltage signal supplied to the inverter controller from the feedback unit, a second switching unit connected to allow the voltage signal divided by the voltage dividing resistor configuration to be passed to a ground when the second switching unit is in an on state and inhibits the voltage signal divided by the voltage dividing resistor configuration from being passed to the ground when the second switching unit is in an off state, and a time interval setting unit for controlling an operation of the second switching unit.

2. The inverter circuit according to claim 1, wherein the inverter controller controls an on/off state of the first switching unit according to the intensity of the electrical signal supplied from the feedback unit.

3. The inverter circuit according to claim 1, wherein the inverter controller controls an on/off state of the first switching unit according to the intensity of the electrical signal controlled by the initial operation controller.

4. The inverter circuit according to claim 1, wherein the initial operation controller is capable of reducing the intensity of the electrical signal supplied to the inverter controller from the feedback unit.

5. The inverter circuit according to claim 1, wherein the initial operation controller is capable of reducing the intensity of the electrical signal supplied to the inverter controller from the feedback unit during a predetermined time interval in an early stage of an operation, and the initial operation controller is capable of maintaining the electrical signal supplied to the inverter controller from the feedback unit when the predetermined time interval has lapsed.

6. The inverter circuit according to claim 1, wherein the time interval setting unit comprises:

a capacitor, wherein the operation of the second switching unit is controlled according to charging and discharging operations of the capacitor.

7. The inverter circuit according to claim 6, wherein the capacitor is connected to a gate terminal of the second switching unit, wherein for operation of the second switching unit, the capacitor is charged with a voltage at an early stage of an operation and then discharged, and when a value of the voltage charged in the capacitor is greater than a threshold voltage of the second switching unit, the second switching unit is turned on such that the voltage signal divided by the voltage dividing resistor configuration is passed to the ground.

8. The inverter circuit according to claim 1, wherein the time interval setting unit comprises a microcomputer, wherein operation of the second switching unit is controlled according to time interval information set in the microcomputer.

9. The inverter circuit according to claim 1, wherein the inverter controller controls an on/off time (duty ratio) of the first switching unit so as to adjust an intensity of the second voltage output from the transformer.

10. A backlight unit, comprising:

an inverter circuit comprising:

an input unit to which a first voltage is applied, a transformer for transforming the first voltage from the input unit to a second voltage, a first switching unit for switching an on/off state of the transformer, an inverter controller for controlling an operation of the first switching unit, an output unit for outputting the second voltage from the transformer, a feedback unit for detecting an electrical signal from the transformer and supplying the detected electrical signal to the inverter controller, and an initial operation controller for controlling an intensity of the electrical signal supplied to the inverter controller from the feedback unit, wherein the initial operation controller comprises:

a voltage dividing resistor configuration that divides a voltage signal supplied to the inverter controller from the feedback unit, a second switching unit connected to allow the voltage signal divided by the voltage dividing resistor configuration to be passed to a around when the second switching unit is in an on state and inhibits the voltage signal divided by the voltage dividing resistor configuration from being passed to the ground when the second switching unit is in an off state, and a time interval setting unit for controlling an operation of the second switching unit; and a light emitting unit for emitting light under a control of the inverter circuit.

11. The backlight unit of claim 10, wherein the light emitting unit comprises a cold cathode fluorescent lamp (CCFL), an external electrode fluorescent lamp (EEFL), or a light emitting diode (LED) lamp.

12. The backlight unit of claim 10, wherein the inverter controller is connected between the feedback unit and the first switching unit.

13. The backlight unit of claim 10, wherein the initial operation controller is connected in parallel between the inverter controller and the feedback unit.

* * * * *